(12) United States Patent
Jeran et al.

(10) Patent No.: US 9,990,167 B2
(45) Date of Patent: Jun. 5, 2018

(54) MOBILE AUTHENTICATION FOR ENABLING HOST DEVICE FUNCTIONS

(75) Inventors: Paul L Jeran, Boise, ID (US); Sean Daniel Fitzgerald, Meridian, ID (US); Kenneth K Smith, Boise, ID (US); Stephen C Kranz, Eagle, ID (US); Kenneth A Lindblom, Boise, ID (US); Anthony Peter Holden, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 14/373,120

(22) PCT Filed: Feb. 1, 2012

(86) PCT No.: PCT/US2012/023515
§ 371 (c)(1),
(2), (4) Date: Jul. 18, 2014

(87) PCT Pub. No.: WO2013/126037
PCT Pub. Date: Aug. 29, 2013

(65) Prior Publication Data
US 2015/0009523 A1    Jan. 8, 2015

(51) Int. Cl.
G06F 3/12      (2006.01)
H04W 12/06     (2009.01)
G06F 21/60     (2013.01)
H04L 29/06     (2006.01)
G06K 15/00     (2006.01)
(Continued)

(52) U.S. Cl.
CPC .......... *G06F 3/1238* (2013.01); *G06F 3/1204* (2013.01); *G06F 3/1239* (2013.01); *G06F 3/1288* (2013.01); *G06F 21/608* (2013.01); *G06K 15/007* (2013.01); *G06K 15/4095* (2013.01); *G06Q 20/40* (2013.01); *H04L 63/0853* (2013.01); *H04L 63/18* (2013.01); *H04N 1/00204* (2013.01); *H04N 1/4426* (2013.01); *H04W 12/06* (2013.01); *H04N 2201/0094* (2013.01)

(58) Field of Classification Search
None
See application file for complete search history.

(56) References Cited

U.S. PATENT DOCUMENTS 6,738,903 B1   5/2004 Haines
6,990,548 B1   1/2006 Kaylor
(Continued)

OTHER PUBLICATIONS

International Search Report & Written Opinion received in PCT Application No. PCT/US2012/023515, dated Jul. 26, 2013, 9 pages.

*Primary Examiner* — Huo Long Chen
(74) *Attorney, Agent, or Firm* — HP Inc. Patent Department

(57) ABSTRACT

A system for adding value to a host device via a mobile communication device is described. The system includes: a host device configured for providing additional value to be utilized, wherein the additional value includes at least one printing device function and is provided in response to receiving an authentication code; a central system configured for providing the authentication code for inputting into the host device to authorize the at least one printing device function to be utilized; and a mobile communication device configured for negotiating the additional value to be applied to the host device.

16 Claims, 3 Drawing Sheets

(51) Int. Cl.
*G06Q 20/40* (2012.01)
*H04N 1/00* (2006.01)
*H04N 1/44* (2006.01)

(56) References Cited

U.S. PATENT DOCUMENTS

| | | | |
|---|---|---|---|
| 7,099,026 B1* | 8/2006 | Hren | G06F 21/10 |
| | | | 358/1.15 |
| 7,114,178 B2 | 9/2006 | Dent et al. | |
| 2005/0007620 A1* | 1/2005 | Kouno | H04N 1/4433 |
| | | | 358/1.14 |
| 2006/0065715 A1* | 3/2006 | Kojima | G06Q 20/32 |
| | | | 235/380 |
| 2007/0039518 A1 | 2/2007 | Schulze-Hagenest et al. | |
| 2007/0159641 A1 | 7/2007 | Liccini et al. | |
| 2007/0258849 A1 | 11/2007 | Kent | |
| 2008/0209569 A1* | 8/2008 | Araki | G06F 21/44 |
| | | | 726/26 |
| 2009/0310787 A1* | 12/2009 | Nishimi | G06F 21/335 |
| | | | 380/277 |
| 2010/0007918 A1* | 1/2010 | Muto | G03G 15/5087 |
| | | | 358/1.15 |
| 2011/0085196 A1* | 4/2011 | Liu | G06F 3/1204 |
| | | | 358/1.15 |
| 2011/0191770 A1* | 8/2011 | Inoue | G06F 9/445 |
| | | | 717/178 |
| 2013/0041830 A1* | 2/2013 | Singh et al. | 705/65 |
| 2013/0157617 A1* | 6/2013 | Piratla | H04W 12/08 |
| | | | 455/411 |

* cited by examiner

MOBILE AUTHENTICATION FOR ENABLING HOST DEVICE FUNCTIONS

FIELD OF THE INVENTION

The field of the invention relates to devices enabled to deliver a printing function(s).

BACKGROUND

Presently, printing devices are in wide-spread use. Generally, printing devices are available for various costs to the consumer, from low-end printing devices with a minimum amount of functions to high-end printing devices with complex printing functions. However, there are many limitations to current available printing devices. For example, when a consumer, having a low-end printing device, wishes to use a complex printing function, that consumer must buy the high-end printing device to do so.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
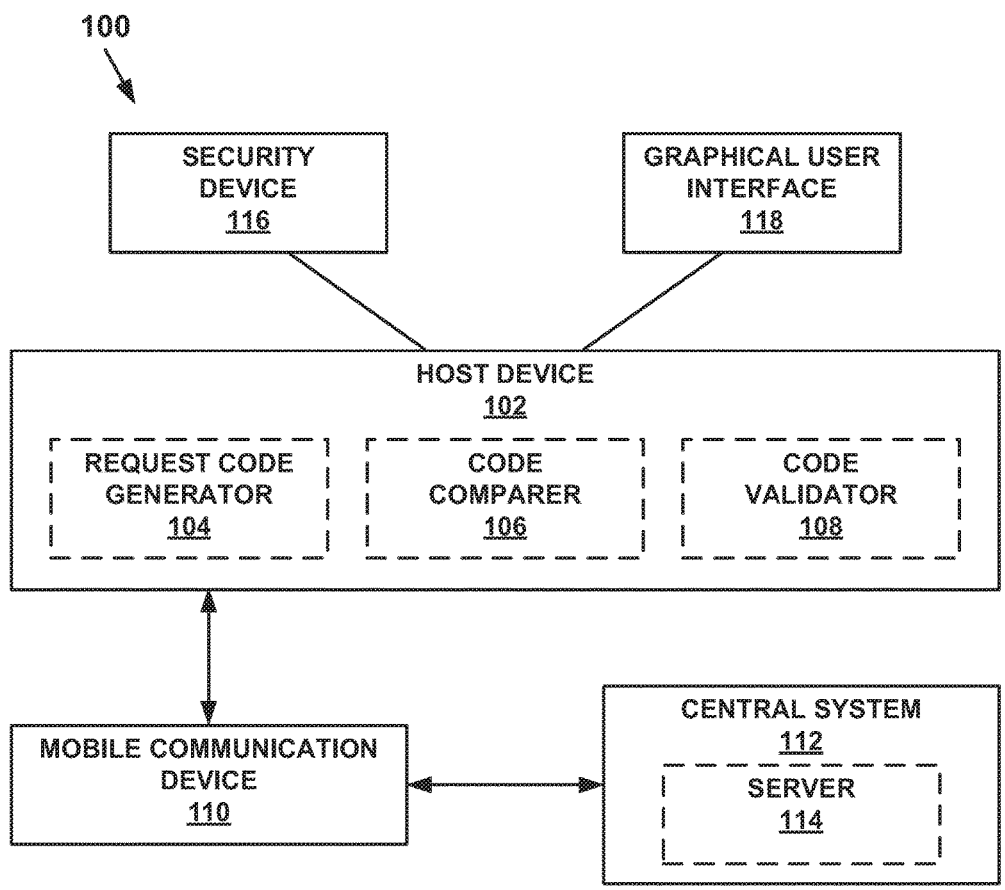
FIGS. 1 and 2 illustrate examples of devices, in accordance with embodiments.
Figure 2:
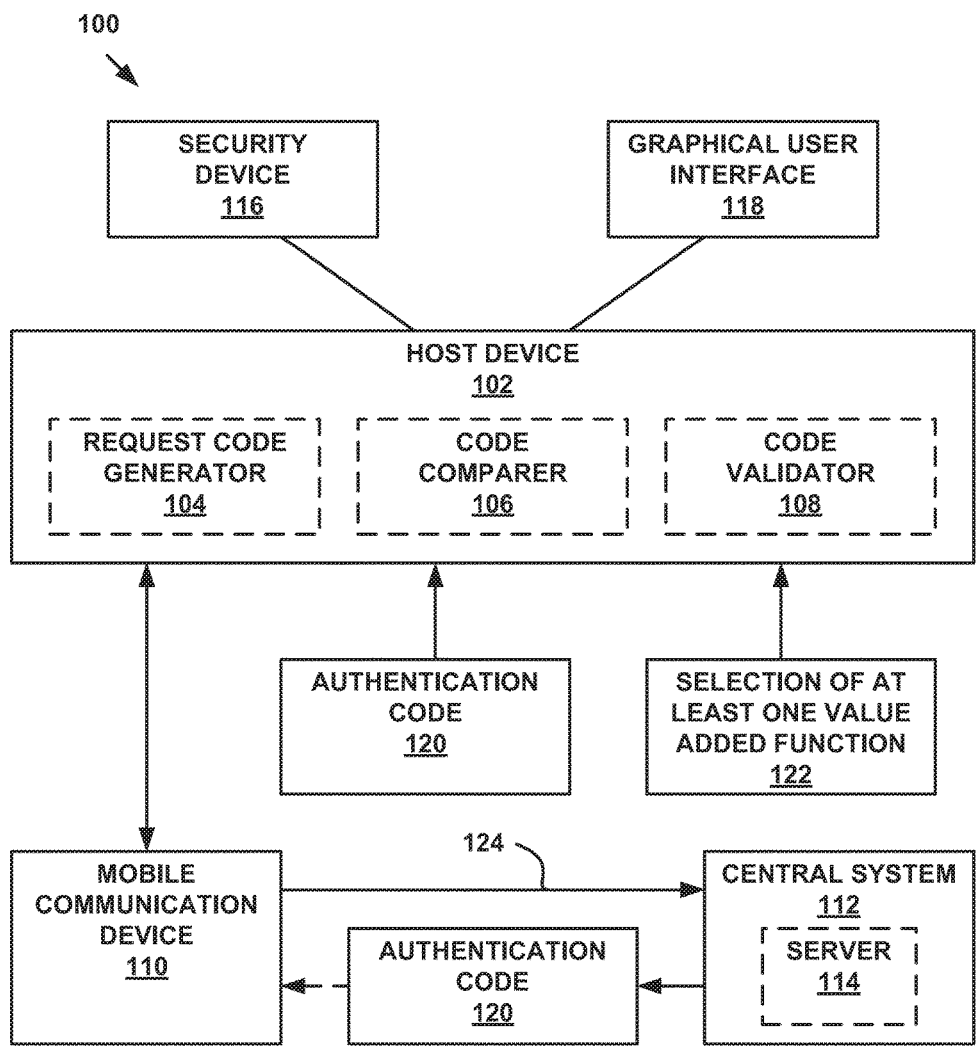

FIGS. 1 and 2 depict an embodiment of system 100. System 100 is configured for adding value to a host device via a mobile communication device, wherein the additional value includes at least one or more printing device functions.

The discussion below will first present a brief overview of at least one embodiment, and its benefits. The discussion will then include a brief description of the components of the system 100. The discussion will next describe the functionality of the components of the system 100, in which one or more printing device functions are added to the host device.

Overview

Embodiments include a method in which a user utilizes a mobile communication device (e.g., cell-phone) as the intermediary system to negotiate and receive the final authorization of additional value to be applied to a host device (e.g., printing device) from a physical medium (e.g., smartcard with a stored value) or an electronic code via an request code (i.e. Mobile Communications, SMS Challenge/Response, etc.). In one embodiment, the host device presents a request code. This request code is entered onto the physical medium that was purchased by the user, and then transmitted to a central system for authentication via the device wire/wireless communication, or via other mobile communication devices (e.g. mobile phone, Smartphone, PDA, etc.). The physical medium has stored upon it a predetermined value for printing device functions (e.g., pages, scans, pixels, databits/bytes, impressions, time, weight/measure, etc.) or a future storable value for printing device functions that may be applied to the host device. The user must transmit, via wire/wireless communication, the request code to a central system for comparison or algorithmic verification for authentication as secure/genuine/unused. The central system validates the transmitted request code either to a list of predetermined/stored codes or via a cryptographic algorithm and provides a unique authentication code response to the user for inputting into the host device in order to authenticate/authorize device functions to be utilized. The host device, after receiving the authentication code, validates the transmitted authentication code either to a list of stored codes in the host device or cryptographically to authenticate the code as genuine and enable the device functions to be performed.

Thus, embodiments enable additional value, such as accessible and available printing device functions, to be added to the host device. Furthermore, the security related to the value available for purchase in the open market is secure and safe from counterfeits. Moreover, authentication may occur without the need for the host device to be connected to the Internet. Customers have the ability to acquire additional value that does not require the value to be authorized by a reseller, and does not require a third party to be physically present or remotely connected to enable additional functionality to be accessed. Further, embodiments enable a user to only purchase a low-end printing device, and then on an as-needed basis with minimal investment, access high-end functions such as duplex or increased print speed on the same printing device.

Components of the System 100

Referring now to FIG. 1, system 100, in one embodiment, includes the host device 102, a central system 112, and the mobile communication device 110. The system 100 optionally includes any of the following: a security device 116 coupled with the host device 102; and a graphical user interface 118 coupled with the host device 102. Further, the host device 102, in various embodiments, includes any of the following: a request code generator 104; a code comparer 106; and a code validator 108. In various embodiments, the central system 112 includes a server 114 or is itself a server 114.

The host device 102 (e.g., a printing device) may be a single or multi-functioning device that is enabled to deliver printing functions, as will be described herein. The mobile communication device 110 may be a 3G, 4G and/or wireless enabled device, such as, but not limited to, a smart phone, a personal digital assistant (PDA), and the like.

Functionality of System 100

Referring now to FIG. 2, the operation of the system 100 will be described in conjunction with further descriptive details of the system 100. In one embodiment, a selection of at least one value added function that is desired to be utilized by a user of the host device 102 is received at the host device 102. This value added function (of the selection) includes at least one printing device function, such as, but not limited to, the following: multiplexing; printing additional pages; printing additional impressions; changing printing speeds; scanning; printing over a certain time period; transferring a certain quantity of data (Bytes, Kilobytes, Megabytes, Terabytes, etc.); printing a specified pixel amount; printing a weight. In other words, the printing device functions may related to, but are not limited to, the method of printing, printing speed, quantity printed, timing of the year during which printing may take place, weight of printed material, measurement related to printed material, scanning, faxing, "Digital Sending", e-mailing, transmission of data to "The Cloud" for central/off-site storage and/or processing, etc.

The value added function may be selected via manual input via a Keypad or via the graphical user interface 118 coupled with the host device 102 or via electronic input, such as wireless communication between a mobile communication device 110 and the host device 102.

In one embodiment, the additional value is provided in response to receiving an authentication code 120, as will be described below with respect to the discussion of the central system 112.

In one embodiment, the request code generator 104 generates a request code to be sent to the central system 112, wherein the request code is unique. In one embodiment, the generation of the request code occurs in response to a selection of at least one printing device function. In various embodiments, the request code appears on a printed card and/or by electronic means (e.g., displayed on a graphical user interface of the host device, wirelessly transmitted to the mobile communication device, etc.).

Further, the host device 102 is enabled to receive input from a user for purchasing additional value via, but not limited to, the following means: a smart card; a credit card; automatic bank transfer, mobile account transfer, and an electronic payment. In one embodiment, a user is presented with pricing information (described below) for various printing functions. After having selected the desired printing function and being presented with, by the host device 102, the cost of the selected printing function, the user may accept or decline the cost. If the user accepts the cost, the host device 102 can act/acts as the financial intermediary and collects and stores and/or transmits the payment to the central system or to a central financial system, and then the central system generates the request code that displayed at the host device 102 and/or transmitted to the user and/or the mobile communication device 110.

Additionally, in one embodiment, the host device 102 includes a control panel that supports communication with the mobile communication device 110. In another embodiment, the host device 102 includes software and/or hardware that supports communication with the mobile communication device 110.

In another embodiment, the host device 102 includes or is coupled with the security device 116. The security device 116, through methods that are commonly known in the field of cryptography, generates a request code that is cryptographically secure. The request code is a single use, non-repeating code.

In yet another embodiment, the host device 102 includes or is coupled with a graphical user interface (GUI) 118. The GUI 118 provides additional value information as well as enabling user interaction between the user and the host device 102. The additional value information includes, but is not limited to the following: available printing device functions/options that the host device is enabled to provide; and pricing of the additional printing device functions. Thus, the GUI 118, in one embodiment, receives input from the user for purchasing additional value that is to be released to be utilized at the host device 102. Additionally, the GUI 118 may be communicated with manually through direct input, and/or via wire and wirelessly.

Of note, the GUI 118 is supported by the control panel of the host device 102 and/or by software of the host device 102.

In one embodiment, the mobile communication device 110 negotiates the additional value to be applied to the host device 102. For example, and as described herein, the mobile communication device 110 is enabled to communicate with the host device 102 and select a desired additional value (e.g., at least one printing device function). A user of the mobile communication device 110 then may input the request code displayed at the host device 102 into the mobile communication device 110 and then transmit 124 this request code to the central system 112 through the mobile communication device 110 wired and/or wirelessly.

In one embodiment, the central system 112 provides the authentication code for inputting into the host device 102 to authorize the at least one printing device functions to be utilized, wherein the authentication code is unique. For example, the central system 112 analyzes or compiles the received request code to determine its authenticity as genuine. If determined to be genuine, the central system 112 generates an authentication code 120. The central system 112 provides this authentication code 120 in an electronic means (e.g., transmitted to the mobile communication device) and/or a physical medium (e.g. card, smartcard with a stored value, SIM card, USB stick, storage card, etc.), in various embodiments.

Of note, the central system 112, in various embodiments, includes, but is not limited to, any of the following: a server 114; a means to enable sales; a means to enable payment for printing functions; and a means for authenticating a request code.

The authentication code 120 is sent to the host device 102 through a variety of ways, in various embodiments. For example, the authentication code 120 is directly input into the host device 102 via a physical medium (e.g., smart card). In another example, the authentication code 120 is transmitted to the mobile communication device 110, which is then forwarded (and transmitted) to the host device 102.

In one embodiment, the host device 102 further includes a code comparer 106. The code comparer 106 validates the authentication code 120 to a set of stored codes in the host device 102 in order to determine if the authentication code 120 is genuine. Further, in another embodiment, the code comparer 106 validates the authentication code 120 via a cryptographic algorithm to determine if the authentication code 120 is genuine.

In one embodiment, the host device 102 includes a code validator 108. The code validator 108 determines the validation of the authentication code 120 based on the validating of the code comparer 106. If the received authentication code 120 is determined to be genuine by the code comparer 106, then the code validator 108 validates the authentication code 120, and the selected printing functions are released to be utilized by the host device 102.

In another embodiment, the host device 102 is presented with or requests a request code. This request code is/has been previously entered onto the physical medium that was purchased by the user. The request code is then transmitted to a central system 112 for authentication via the device wire/wireless communication, or via other mobile communication device 110. For example, in one case, a secure card or SIM card may already have a request code encoded within the card technology itself, and does not require "external" generation or verification of a request code. In another instance, a request code is encoded on a secure card or SIM card, but an additional layer of security is required to mitigate counterfeit and fraud, and the host device 102 requires/requests a "second" authentication code from the central system 112 that provides the final or "real" authentication code that is then transmitted to the host device 102 (wirelessly or physically through a control panel or GUI) which receives the authentication code and "unlocks" the value previously purchased by the user.

Figure 3:
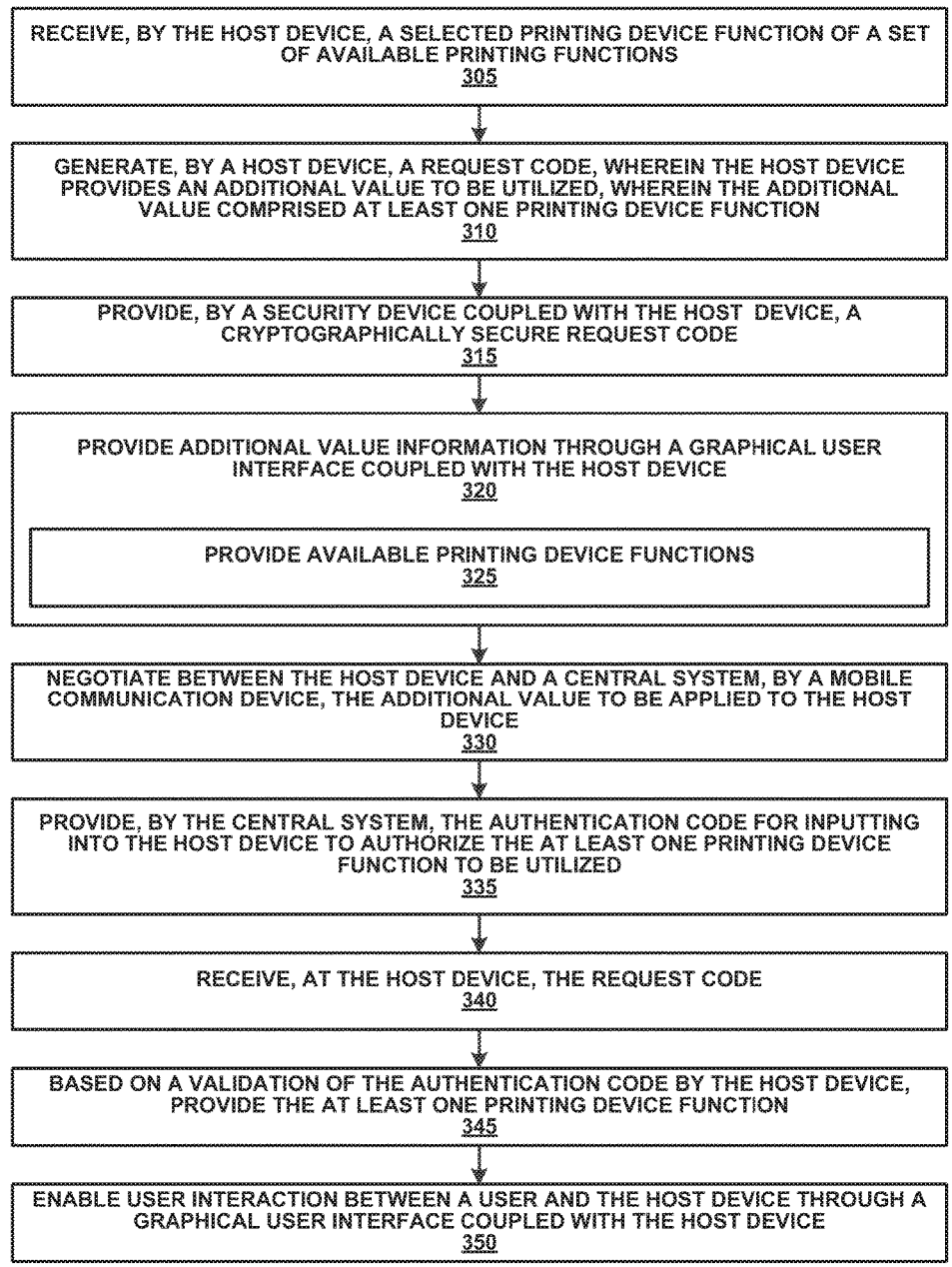
FIG. 3 illustrates an example of a method for adding a printing device function to a host device, in accordance with embodiments.

FIG. 3 depicts a flow chart of method 300, in accordance with embodiments, respectively. In various embodiments, at least portions of method 300 are carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 300 is performed by system 100, as described in relation to FIGS. 1 and 2.

With reference now to FIGS. 1-3, at 305 of method 300, in one embodiment and as described herein, the host device 102 receives a selected printing device function of a set of available printing device functions that y be accessed by the user, if released.

At 310 of method 300, in one embodiment and as described herein, the host device 102 generates a request code, wherein the host device 102 provides an additional value to be utilized, wherein the additional value comprises at least one printing device function. Further, in one embodiment, the generating of the request code is based on the receiving. At 315 of method 300, in one embodiment and as described herein, the security device 116 that is coupled with the host device 102 provides a cryptographically secure authentication code.

At 320 of method 300, in yet another embodiment and as described herein, additional value information is provided through the GUI 118 coupled with the host device 102. At 325 of method 300, in one embodiment and as described herein, the additional value information provided is available printing device functions.

At 330 of method 300, in one embodiment and as described herein, the mobile communication device 110 negotiates between the host device 102 and the central system 112, the additional value to be applied to the host device 102.

At 335 of method 300, in one embodiment and as described herein, the central system 112 provides the authentication code 120 for inputting into the host device 102 to authorize the at least one printing device function to be utilized.

At 340 of method 300, in one embodiment and as described herein, the host device 102 receives the authentication code 120.

At 345 of method 300, in one embodiment and as described herein, based on a validation of the authentication code 120 by the host device, the host device 102 provides the at least one printing device function.

At 350 of method 300, in one embodiment and as described herein, user interaction is enabled between a user and the host device 102 through the GUI 118 coupled with the host device 102.

Various embodiments are thus described. While particular embodiments have been described, it should be appreciated that the embodiments should not be construed as limited by such description, but rather construed according to the following claims.

What we claim is:

1. A system comprising:
   a printing device to, in response to a user input requesting a value-added function from a user interface of the printing device, display a cost for the value-added function, send corresponding payment for the function to a financial server, and in response receive from the financial server a corresponding request code to be, displayed on the user interface and to be inputted into a mobile communication device of the user; and
   a central server in network communication with the mobile communication device of the user to receive the request code, along with identification information for an account associated with the mobile communication device of the user, the central server responding to receiving the request code by (i) validating the request code, and (ii) in response to validating the request code, providing a corresponding authentication code to the mobile communication device;
   wherein the printing device responds to the user inputting the corresponding authentication code on the user interface of the printing device by (i) comparing the corresponding authentication code to a set of codes stored on the printing device, (ii) based on the set of stored codes indicating that the corresponding authentication code is genuine, validating the corresponding authentication code, and (iii) in response to validating the corresponding authentication code, unlocking the requested value-added function.

2. The system of claim 1, wherein the printing device provides the user with the request code to be inputted into the mobile communication device in response to determining that the user has made a selection, via a graphical user interface, for the requested value-added function.

3. The system of claim 1, wherein the request code is a unique request code specific to the requested value-added function.

4. The system of claim 1, wherein the printing device is a multi-function device.

5. The system of claim 1 wherein the value-added function is related to one of: a method of printing, a printing speed, a print quantity, a timing of the year during which printing may take place, a weight of printed material, a measurement related to printed material, scanning, faxing, e-mailing, or transmission of data for remote site storage.

6. The system of claim 1, wherein the printing device receives and validates the authentication code without communicating over the Internet.

7. The system of claim 1, wherein the printing device further validates the authentication code using a cryptographic algorithm.

8. The system of claim 1, wherein the request code is encoded in a secure card of the printing device.

9. The system of claim 8, wherein the secure card comprises a Subscriber Identity Module ("SIM") card of the printing device.

10. A method for providing value-added functions on a printing device, the method comprising:
    in response to a user input requesting a value-added function from a user interface of the printing device, displaying a cost for the value-added function, sending corresponding payment for the function to a financial server, and in response receiving from the financial server a corresponding request code to be displayed on the display, the request code to be inputted into a mobile communication device of the user for transmission to a central server along with identification information for an account associated with the mobile communication device of the user, wherein upon validation of the request code by the central server, the mobile communication device receives a corresponding authentication code from the central server, to unlock the requested value-added function on the printing device; and in response to the user inputting the corresponding authentication code on the user interface of the printing device, (i) comparing the corresponding authentication code to a set of codes stored on the printing device, (ii) based on the set of stored codes indicating that the corresponding authentication code is genuine, validating the corresponding authentication code, and (iii) in response to validating the corresponding authentication code, unlocking the requested value-added function.

11. The method of claim 10, wherein the requested value-added function is selected from a set of available value-added functions on the printing device.

12. The method of claim 10, wherein the printing device generates the request code in response to determining that the user has selected, via a graphical user interface of the printing device, the value-added function.

13. The method of claim 10 wherein the value-added function is related to one of: a method of printing, a printing speed, a print quantity, a timing of the year during which printing may take place, a weight of printed material, a measurement related to printed material, scanning, faxing, e-mailing, or transmission of data for remote site storage.

14. The method of claim 10, wherein the printing device receives and validates the corresponding authentication code without communicating over the Internet.

15. The method of claim 10, wherein the request code is encoded in a secure card of the printing device.

16. The method of claim 15, wherein the secure card comprises a Subscriber Identity Module ("SIM") card of the printing device.

* * * * *